(No Model.)
M. WEBSTER.
HAND CARRIAGE.
No. 254,181. Patented Feb. 28, 1882.
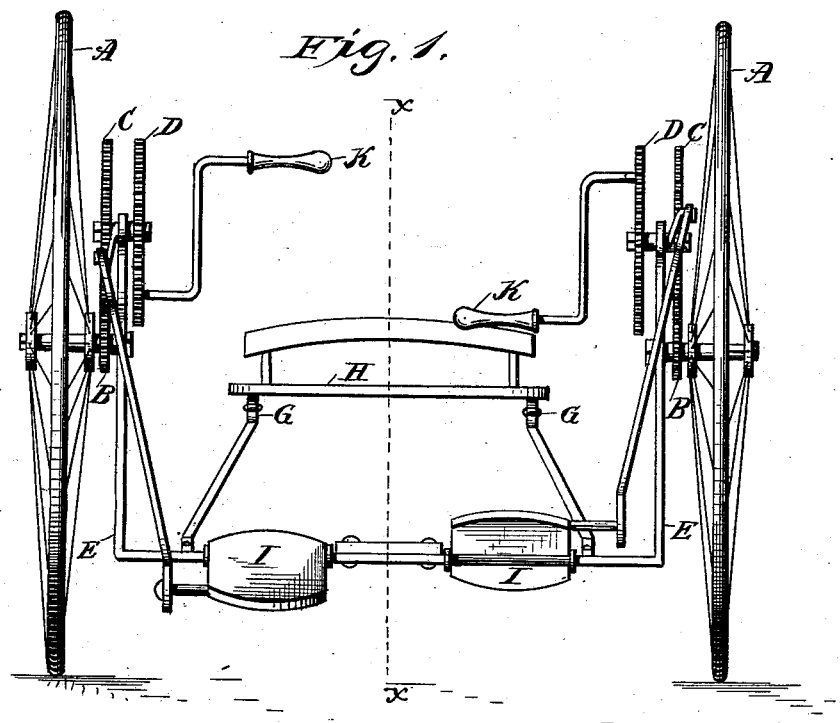
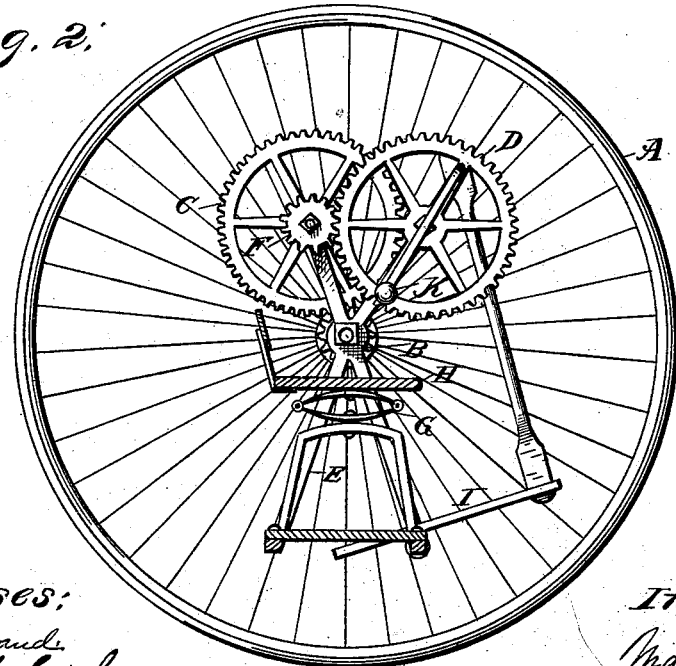
Witnesses:
F. L. Ourand
Belva A. Lockwood.
Inventor:
Maria Webster

UNITED STATES PATENT OFFICE.

MARIA WEBSTER, OF FARMINGTON, MICHIGAN.

HAND-CARRIAGE.

SPECIFICATION forming part of Letters Patent No. 254,181, dated February 28, 1882.

Application filed January 16, 1882. (No model.)

*To all whom it may concern:*

Be it known that I, MARIA WEBSTER, a citizen of the United States, and a resident of Farmington, Oakland county, and State of Michigan, have invented a new and useful Improvement in Hand-Carriages, which may be moved by the hands or the feet, or both, as necessity or convenience may dictate, and may be propelled up hill or down hill, or over a rough road as well as on a smooth surface, thus doing away with the use of a horse for the ordinary purposes of locomotion, and providing a machine that will be light, comfortable, and durable, adapted to the convenience of either men or women, and suitable for either pleasure or business; and I do hereby declare that the following is a full, clear, and exact description of my invention, which will enable any person skilled in machinery to make and use the same.

Figure 1 in the drawings is a front view of a device embodying my invention. Both sides of the machine as divided by the line *x x* are alike. It consists of two large wheels, A A, one on either side, five (5) feet in diameter, constructed of wood, like a carriage-wheel, or of double steel wires, like a bicyle-wheel. Attached to the center of each large wheel A is a small cog-wheel, B, five (5) inches in diameter, and surrounding the hub upon which plays cog-wheel C, fifteen (15) inches in diameter, which said wheel is driven by crank-wheel D, also fifteen inches in diameter, which is made to engage with the small cog-wheel F, five (5) inches in diameter, which is attached to wheel C by journal. The two large wheels A A are connected together by an axle-tree, (standing four feet apart,) or a frame-work, E E, made in two parts and dropping downward to about eight (8) inches from the ground, where it separates into two parts from sixteen (16) to eighteen (18) inches apart, forming at the bottom a base or supports for seat H and pedals I I, which said pedals are connected by rods to crank-wheels D D, so that the machine is propelled by the same gearing whether turned by hands or by feet. The seat H is supported by braces on either side, fastened to the bottom of the frame-work, and to the top of which is securely attached the springs G G, on which the seat H rests. This frame-work E E has two arms on either side, extending upward so as to form supports for the journals on which the cog-wheels play.

Fig. 2 shows the inside of the large wheels A, with the action of crank-wheel D on small cog-wheel F, which is firmly fastened to wheel C, said wheel C engaging with small cog-wheel B, which propels the carriage whether the hand-cranks K K or the foot-pedals I I are put in motion; and it shows also section of seat H, with one spring G, and section of frame work E, with one pedal I. This pedal I is so constructed that a portion of it slips over the toe of the foot, and may be used in connection with the hands as a brake in going down hill.

The machine is guided or turned quite around by turning the crank on one side while the other rests. So both feet or both hands may be rested when fatigued.

The advantage of this carriage over other two-wheeled and three-wheeled vehicles propelled without horse-power is that by the aid of the hand-crank it can readily be made to go up hill or over rough and stony roads, while one revolution of the hand-crank or the foot-crank gives three revolutions to the large wheel, thus giving it great velocity with but slight expenditure of force, while the omission of the guide-wheel enables the rider to turn very rapidly and in the shortest possible space. The sinking of the spring-seat below the axle gives great ease and great security to the rider, and prevents the danger of upsetting the carriage, while it is easy, commodious, and graceful for a woman to ride, and equally convenient for a man. The foot-crank is short, thus preventing the ungraceful motion of the tricycle now in use, while the rider can stop at any point without dismounting, as in the bicyle, or being compelled to balance himself. The rider sits so securely and so little effort is required to guide the machine that parcels and bundles may readily be carried.

What I claim, and desire a patent on, is—

1. The two X-shaped side frames, E E, having their lower limbs connected by transverse bars, upon which the seat is supported below the axis of the wheels, in combination with wheels A A, gear-wheels C D, pinions B F, and cranks K K, all substantially as described.

2. The two connected X-shaped side frames, E E, the gear-wheels C D, pinions B F, wheels A A, pedals I I, connecting-rods, and hand-cranks K K, all combined and operating substantially as described.

MARIA WEBSTER.

Witnesses:
LURA M. ORMES,
LIZZIE M. HERRING.